United States Patent
Marquardt et al.

(10) Patent No.: US 10,681,016 B2
(45) Date of Patent: Jun. 9, 2020

(54) METHOD AND APPARATUS FOR OPERATING A CONNECTED DEVICE USING A SECURE ELEMENT DEVICE

(71) Applicant: Giesecke+Devrient Mobile Security America, Inc., Dulles, VA (US)

(72) Inventors: John Scott Marquardt, Washington, DC (US); Eric Johnson, Reston, VA (US)

(73) Assignee: GIESECKE+DEVRIENT MOBILE SECURITY AMERICA, INC., Dulles, VA (US)

( * ) Notice: Subject to any disclaimer, the term of this patent is extended or adjusted under 35 U.S.C. 154(b) by 0 days.

(21) Appl. No.: 16/083,228

(22) PCT Filed: Jun. 6, 2017

(86) PCT No.: PCT/US2017/036206
§ 371 (c)(1),
(2) Date: Sep. 7, 2018

(87) PCT Pub. No.: WO2018/226214
PCT Pub. Date: Dec. 13, 2018

(65) Prior Publication Data
US 2019/0364023 A1 Nov. 28, 2019

(51) Int. Cl.
*H04L 29/06* (2006.01)
*G06F 21/72* (2013.01)
*H04L 9/32* (2006.01)

(52) U.S. Cl.
CPC .......... *H04L 63/0428* (2013.01); *G06F 21/72* (2013.01); *H04L 9/321* (2013.01); *H04L 63/0876* (2013.01)

(58) Field of Classification Search
CPC .. H04L 63/0428; H04L 63/0876; G06F 21/32
See application file for complete search history.

(56) References Cited

U.S. PATENT DOCUMENTS

2014/0154979 A1 6/2014 Tomas et al.
2014/0189821 A1 7/2014 Ying et al.
(Continued)

FOREIGN PATENT DOCUMENTS

WO 2016/097685 A1 6/2016

OTHER PUBLICATIONS

Korean Intellectual Property Office, International Search Report and Written Opinion of the International Searching Authority in International Patent Application No. PCT/US2017/036206, dated May 18, 2018.

(Continued)

*Primary Examiner* — Dao Q Ho
(74) *Attorney, Agent, or Firm* — Faegre Drinker Biddle & Reath LLP (57) ABSTRACT

A secure element device for use in a connected device includes a first interface configured to enable communication with a communication module and a second interface configured to enable communication with an action module of the connected device. A processor coupled to the first interface and the second interface, executes a first set of computer-readable instructions, stored in a memory of the secure element device, to authenticate, via the first interface, the connected device on the communication network. The processor also executes a second set of computer-readable instructions, stored in the memory, to perform one or both of (i) obtaining, via the second interface, data from the action module, the data to be transmitted over the communication network and (ii) controlling, via the second interface, the action module to cause the action module to perform one or more operations based on an instruction received over the communication network.

15 Claims, 5 Drawing Sheets

(56) References Cited

U.S. PATENT DOCUMENTS

2015/0229654 A1   8/2015  Perier
2016/0173495 A1   6/2016  Joo

OTHER PUBLICATIONS

The International Bureau of WIPO, International Preliminary Report on Patentability for International Application No. PCT/US2017/036206, dated Dec. 19, 2019.

METHOD AND APPARATUS FOR OPERATING A CONNECTED DEVICE USING A SECURE ELEMENT DEVICE

This application is a U.S. National Stage Patent Application under 35 U.S.C. § 371 of International Patent Application No. PCT/US2017/036206, filed Jun. 6, 2017, the disclosure of which is incorporated herein by reference in its entirety.

FIELD OF THE DISCLOSURE

The present disclosure relates generally to communication networks and, more particularly, to devices and methods for securely operating a connected device operating in a communication network.

BACKGROUND

Internet of Things (IoT) is a network of devices ("connected device") communicatively connected to exchange information with host devices and/or with each other. The connected devices may include, for example, remote sensors, cameras and other monitoring devices installed at various locations in buildings, homes, factories, roads, etc., to collect data characterizing various conditions such as temperature, operating pressure, traffic conditions, etc., and to provide the data, via a communication network, to one or more host devices, for example for analysis of the data by the one or more host devices. Further, in some applications, the connected devices may include control devices, such as actuators. In such applications, a host device may transmit instructions via a communication network to the connected device to cause the connected device to perform a desired function, such as to change a thermostat setting, to adjust a valve, to adjust lighting, for example. In order to communicate with another device (e.g., a host device) over the network, a connected device typically needs to first authenticate itself on the network and establish a connection with the other device on the network. Once a connected device has been authenticated on the network, and a connection with a host device has been established, the connected device may transmit collected data to the host device over the network and/or may receive instructions from the host device over the network.

Operation of connected devices and data collected by the connected devices are often sensitive to security breaches and hacking. Moreover, because the connected devices are often located in remote locations and are generally unmanned, such devices may become subject to physical tempering by unwanted parties. Thus, ability to securely operate such connected device and to securely store and transmit data collected by the connected device is needed. On the other hand, to make the connected devices more attractive to consumers, the there is a need for the connected devices to be small in size, low in power consumption, and cost-efficient.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

An embodiment of the present disclosure relates to a secure element device for use in a connected device. The secure element device includes a first communication interface configured to enable communication with a communication module of the connected device and a second communication interface configured to enable communication with an action module of the connected device. The secure element device further includes a memory that stores (i) a first set of computer-readable instructions for authenticating the connected device on a communication network and (i) a second set of computer-readable instructions for operating the action module. A processor coupled to the first communication interface, the second communication interface and the memory, is configured to execute the first set of computer-readable instructions to authenticate, via the first communication interface, the connected device on the communication network, and execute the second set of computer-readable instructions to perform one or both of (i) obtaining, via the second communication interface, data from the action module, the data to be transmitted over the communication network and (ii) controlling, via the second communication interface, the action module to cause the action module to perform one or more operations based on an instruction received over the communication network.

Another embodiment of the present disclosure relates to a method for operating a connected device that includes a communication module, a secure element device and an action module. The method includes authenticating, by the secure element device based on a first set of computer-readable instructions and via a first communication interface, the connected device to communicate on a communication network, wherein the first communication interface is configured to enable communication between the secure element device and the communication module. The method additionally includes performing, by the secure element based on a second set of computer-readable instructions, one or both of (i) obtaining, via a second communication interface, data from the action module, the data to be transmitted over the communication network and (ii) controlling, via the second communication interface, the action module to cause the action module to perform one or more operations based on an instruction received over the communication network, wherein the second communication interface is configured to enable communication between the secure element device and the action module.

Yet another embodiment of the present disclosure relates to a non-transitory, computer-readable medium or media storing encrypted computer-readable instructions that, when decrypted and executed by a processor of a secure element device disposed in a connected device, cause the processor to perform operations comprising authenticating the connected device to communicate on a communication network; and performing one or both of (i) obtaining data from an action module disposed in he connected device, the data to be transmitted over the communication network and (ii) controlling the action module to cause the action module to perform one or more operations based on an instruction received over the communication network.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments described herein generally relate to methods and apparatus for securely and efficiently operating connected devices, such as connected devices used in various internet of things (IoT) applications, for example. In various embodiments described herein, functionality of controlling main function(s) of a connected device is provided by a secure element device, such as a subscriber identity module (SIM) or a universal integrated circuit card (UICC), that is also used for authenticating the connected device on a communication network. For example, a processor or another suitable component disposed in a secure element device used by a connected device for authentication of the connected device on a communication network is also used by the connected device for operating a sensor, a camera, an actuator, etc. of the connected device, in an embodiment. Because operation of the connected device is performed by the secure element device, computer-readable instructions for operating the connected device and data collected by the connected device benefit from various security and tamper resistance features (described in more detail below) of the security element device, in at least some embodiments.

Moreover, because operation of the connected device is performed by the secure element device, a separate application processor, such as a general purpose processor, which may be necessary for certain higher-bandwidth data and voice applications, is not needed for controlling the main function(s) of the connected device, and may be altogether omitted from the connected device, in at least some embodiments. Consequently, using a secure element device of a connected device to operate the main function(s) of the connected device results in more secure operation of the connected device and may also reduce size, power consumption and cost of the connected device as compared to conventional connected devices that utilize a general purpose microprocessor for controlling the main function(s) of the connected device, in at least some embodiments.

Figure 1:
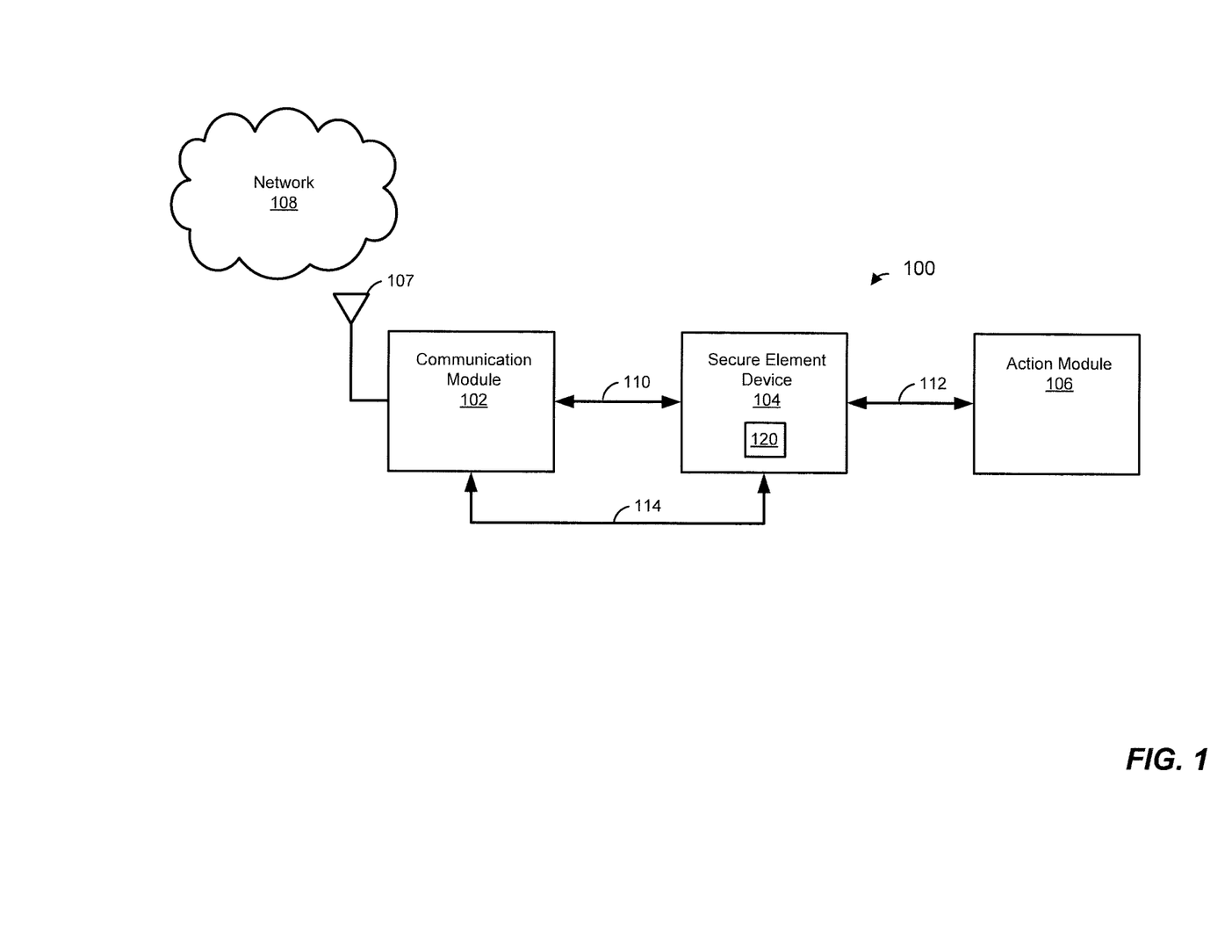
FIG. 1 is a block diagram illustrating an example secure connected device, according to one or more embodiments described herein.

FIG. 1 is a block diagram of a connected device 100, according to an embodiment. Connected device 100 includes a communication module 102, a secure element device 104 and an action module 106. Action module 106 generally performs the main function(s) of connected device 100. Action module 106 may include a sensor, a camera, an actuator, etc. for performing the main function(s) of connected device 100. For example, in an embodiment in which connected device 100 is configured to monitor an environment in which connected device 100 is operating, action module 106 may include a sensor for collecting data, such as temperature data, pressure data, movement data, etc. that characterizes the environment. In another exemplary embodiment whereby connected device 100 is configured to control operation of a physical device, such as a lighting control element, a door lock, a thermostat, etc., action module 106 may include an actuator configured to cause the desired physical effect.

Communication module 102 may be configured to enable connected device 100 to communicate over a communication network 108, for example to transmit data collected by action module 106 to another device (e.g., a host device) operating on communication network 108 and/or to receive instructions for operating action module 106 from another device operating on communication network 108. Communication network 108 may be a wide area network (WAN) such as the Internet, a local area network (LAN), or any other suitable type of communication network. Communication network 108 may be a single communication network or may be made up of multiple different communication networks, in some embodiments. Communication module 102 may be a modem or another suitable communication module that enables connected device 100 to transmit signals on communication network 108 and to receive signals from communication network 108. In the embodiment of FIG. 1, communication module 102 is illustrated as being coupled to an antenna 107 for communicating with communication network 108. In another embodiment, communication module 102 may instead be coupled to the communication network 108 via a wired connection, and may transmit and receive signals over the wired connection.

Secure element device 104 may be, for example a SIM card, a UICC device, a Trusted Platform Module (TPM), or another suitable secure element device. Secure element device 104 may be configured to perform various network operations, which may include authenticating connected device 100 on communication network 108. Using a SIM Tool Kit (STK) JAVA-based programming language, or other means for programming a SIM, secure element device 104 may be further configured such that the network operations additionally include other operations such as, for example, establishing a connection between connected device 100 and another device (e.g., a host device) operating on communication network 108. In addition to performing network operations, secure element device 104 may also be configured to operate action module 106 to control the main function(s) of connected device 100. For example, secure element device 104 may perform one or more operations for operating action module 106, the one or more operations including, but not limited to, instructing action module 106 to collect data (e.g., sensor data) at a certain time and/or for a certain period of time, obtaining data from action module 106, providing data obtained from action module 106 to communication module 102 for transmission of the data over communication network 108, controlling an actuator included in action module 106, etc., in various embodiments. In some embodiments, secure element device 104 may also enable identification and management of connected device 100, for example for providing secure upgrades for operation of connected device 100.

Secure element device 104 is coupled to communication module 102 via a first link 110, which may provide, to the secure element device 104 from the communication module 102, various signals needed for operation of secure element device 104. Link 110 may include, for example, a power line for providing operational voltage (e.g., Vcc) to secure element device 104, a ground line, a clock line for providing a clock signal to secure element device 104, and a reset line, in an embodiment. Additionally, link 110 includes one or more input/output (I/O) lines for carrying communication signals from secure element device 104 to communication module 102 and vice versa. Secure element device 104 communicates with communication module 102 via the one or more I/O lines of link 110 to authenticate connected device 100 on communication network 108 and to enable connected device 100 to communicate with one or more other devices operating on communication network 108.

In an exemplary embodiment, secure element device 104 is coupled to action module 106 via a second link 112 and is coupled to communication module 102 additionally via a third link 114. Second link 112 enables secure element device 104 to communicate with action module 106, for example to obtain data collected by action module 106, to provide control signals to action module 106 for operation thereof, etc Third link 114 enables secure element device 104 to communicate with and/or to control communication module 102 to transmit information (e.g., data) collected by action module 106 to communication module 102 for transmission of the information by communication module 102 over communication network 108, to receive instructions for operating action module 106, the instructions having been received by communication module 102 over communication network 108, to control operation of communication module 102, etc. In an embodiment, third link 114 communicatively enables secure element device 104 to instruct and control communication module 102 in manner similar to the operation of other connected devices that employ a separate application processor, such as a general purpose processor, to control a communication module or modem.

Secure element device 104 may comprise a processor (e.g., a central processing unit (CPU)) 120 configured to perform network operations and to operate action module 106 to perform the main function(s) of connected device 100. In an embodiment, the processor 120 is an STMicro- electronics secure microprocessor, such as an ST33G series microprocessor secure microprocessor, or any other suitable secure microprocessor. In an embodiment, processor 120 is of relatively low complexity needed for performing predictable and generally not computationally intensive operations for authenticating on communication network 108, establishing a connection on the communication network 108, and controlling the action module 106. Consequently, processor 120 may be smaller in size and lower in power consumption relative to an application processor, such as a general purpose microprocessor, that is typically used for controlling a main function of a conventional connected device. Further, connected device 100 may omit a more complex microprocessor, such as a general purpose microprocessor altogether, resulting in a reduced size, cost and power consumption of connected device 100 as compared to a conventional connected device that includes a more complex (e.g., general purpose) microprocessor for controlling the main function of the connected device that may be used for higher-bandwidth real time applications such as voice and video, applications that involve interfacing with humans, etc.

Secure element device 104 may include one or more security and/or tamper-resistance features. For example, secure element device 104 may include a memory (not shown) to store computer-readable instructions and/or data in an encrypted form, making it difficult for an unwanted party to obtain the computer-readable instructions and/or data from secure element device 104, which distinguishes secure element device (e.g., SIM/UICC) from general purpose microprocessors. Processor 120 may be configured to decrypt instructions read from the memory prior to executing the instructions and/or to encrypt data, such as data obtained from action module 106, prior to storing the data in a memory. Additionally, secure element device 104 may be disposed in tamper resistant packaging and/or may include tamper resistance hardware configured to prevent physical tampering with secure element device 104 and impede reverse engineering of instructions stored on secure element device 104, in various embodiments. For example, secure element device 104 may include one or more conductive layers that may prevent reading of internal signals of secure element device 104. As another example, the secure element device 104 may be designed such that a memory that stores data and/or instructions is zeroed out in case of physical tampering with the secure element device 104. Such additional security provides improved protection for IoT devices over conventional general purpose microprocessor as the security advantages of secure element devices such as SIM/UICC is well-understood in the art.

In an embodiment, the various components of connected device 100 described above are implemented using hardware components, such as one or more integrated circuits (ICs) and/or one or more discrete hardware components. For example, in an embodiment, communication module 102 is a hardware device implemented on one or more ICs and/or using one or more discrete hardware components. Similarly, action module 106 is a hardware device implemented on one or more ICs and/or using one or more discrete hardware components, in an embodiment. Further, secure element device 104 is a hardware device implemented on one or more integrated circuits (ICs) and/or using one or more discrete hardware components, in an embodiment. For example, various components, such as processor 120, memory components, interfaces of secure element device 104 (described in more detain bellow) are implemented on one or more integrated circuits (ICs) and/or using one or more discrete hardware components, in an embodiment.

It is noted that although FIG. 1 illustrates only one connected device 100 operating on communication network 108, multiple connected devices, including connected devices the same as or similar to connected device 100, may operate on communication network 108. In such embodiments, various connected device operation and management techniques described herein may be used to operate and manage multiple connected devices operating on communication network 108.

Figure 2A:
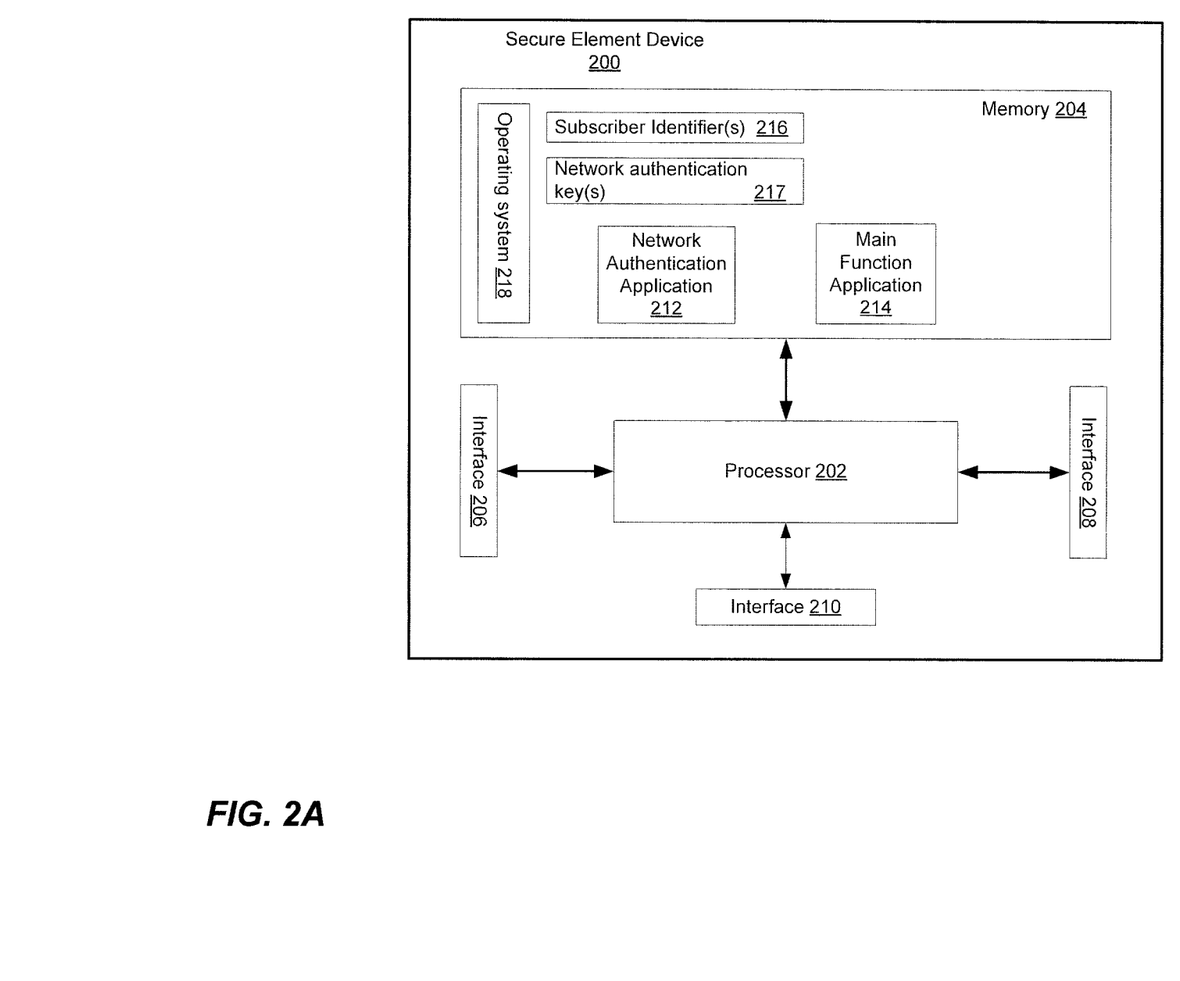
FIG. 2A is a block diagram illustrating an example secure element device of the connected device of FIG. 1, according to one or more embodiments described herein.

FIG. 2A is a block diagram illustrating a secure element device 200. In an embodiment, secure element device 200 corresponds to secure element device 104 of connected device 100 of FIG. 1. In another embodiment, secure element device 200 is used with a suitable device different from connected device 100 of FIG. 1. Similarly, in some embodiments, secure element device 104 of connected device 100 of FIG. 1 is different from the secure element device 200. For ease of explanation, secure element 200 is described with reference to connected device 100 of FIG. 1.

Secure element device 200 includes a processor 202 and a memory 204. Processor 202 corresponds to processor 120 in FIG. 1 and includes one or more security features, for example as described above with respect to processor 120 of FIG. 1, in an embodiment. Like processor 120, processor 202 may be of relatively low complexity as compared to a general purpose processor. For example, processor 202 may be an 8-bit processor, a 32-bit processor, or another suitable type of a relatively low-capability processor. Memory 204 may include volatile memory, such as Random Access Memory (RAM), and may also include nonvolatile memory, such as Read Only Memory (ROM), EEPROM or flash memory, for example.

With continued reference to FIG. 2A, secure element device 200 may include a first communication interface 206 for connecting to, and communicating with, communication module 102 of FIG. 1. In an embodiment, first communication interface 206 is connected to first link 110 in FIG. 1. In operation, secure element device 200 may utilize first communication interface 206 to obtain, from communication module 102, various signals needed for operation of security element device 200. For example, in an embodiment, secure element device 200 may utilize first communication interface 206 to obtain, from communication module 102, a power signal for powering various components of secure element device 200, a ground signal, a clock signal for operating various components of secure element device 200, and a reset signal used to reset various components of secure element device 200. Additionally, secure element device 200 may utilize first communication interface 206 for communicating with communication module 102 for performing network operations such as operations related to authenticating connected device 100 on communication network 108. In an exemplary embodiment, first communication interface 206 is a standardized communication interface, such as a communication interface specified by the International Organization for Standardization (ISO), such as ISO 7816 interface, for example. Accordingly, first communication interface 206 is sometimes referred to herein as an "ISO interface." In other embodiments, however, first communication interface 206 is a suitable type of communication interface other than an ISO interface, such as a Single Wire Protocol (SWP)/ETSI 102 613 interface or serial peripheral interface (SPI) interface, for example. In another embodiment, first communication interface 206 is one of (i) a general purpose input output (GPIO) interface, and (ii) an inter-integrated circuit (I2C) interface.

Secure element device 200 also includes a second communication interface 208 for connecting to, and communicating with, action module 106 of FIG. 1. In an embodiment, second communication interface 208 is connected to second link 112 in FIG. 1. Secure element device 200 may utilize second communication interface 208 for communicating with action module 106, for example for obtaining data from action module 106, providing control signals to action module 106, providing instructions to action module 106, etc. Second communication interface 208 is one of (i) a general purpose input output (GPIO) interface, (ii) a serial peripheral interface (SPI), (iii) an inter-integrated circuit (I2C) interface, and (iv) a Single Wire Protocol (SWP/ETSI 102 613 interface. In another embodiment, second communication interface 208 is another suitable type of communication interface.

Secure element device 200 also includes a third communication interface 210 for connecting to, and communicating with, the communication module 102 of FIG. 1. In an embodiment, third communication interface 210 is connected to third link 114 in FIG. 1. In operation, secure element device 200 may utilize third communication interface 210 to provide, to communication module 102, data obtained from action module 106 for transmission of the data over communication network 108 and/or to receive, from communication module 102, instructions for operating action module 106, the instructions having been received by communication module 102 over communication network 108. In an embodiment, third communication interface 210 is a standard AT command interface. In another embodiment, third communication interface 210 is a port or registered mapped interface. In yet another embodiment, third communication interface 210 is another suitable type of communication interface.

The first communication interface 206, second communication interface 208, and third communication interface 210 may utilize the same physical hardware and need not be physically different (e.g., located on different pins of processor 202). First communication interface 206, second communication interface 208, and third communication interface 210 may be virtual interfaces, for example, I2C interfaces, which allow connection and communication to targets identified in the data transmitted.

Memory 204 of secure element device 200 may store a network authentication application 212 comprising a first set of computer-readable instructions (sometimes referred to herein "computer-readable instructions 212") and a main function application 214 comprising a second set of computer readable instructions (sometimes referred to herein "computer readable instructions 214"). Processor 202 may execute the first set of computer-readable instructions 212 to authenticate connected device 100 on communication network 108 and to establish a connection to enable connected device 100 to communicate with one or more other devices operating on the communication network 108. Authenticating connected device 100 on communication network 108 and establishing a connection for connected device 108 may be performed, for example, using various network authentication information, such as subscriber identifier(s) (e.g., international mobile subscriber identity (IMSI) number) 216 and network authentication key(s) 217, which information may be stored in memory 204, or may be stored in another suitable memory coupled to, and accessibly by, processor 202. Subscriber identifier(s) 216 and network authentication key(s) 217 may be provided to secure element device 200 by a network operator (e.g., mobile network operator (MNO)) of communication network 108, for example, in an embodiment.

Processor 202 may also execute the second set of computer-readable instructions 214 to operate action module 106. For example, processor 202 may execute the second set of computer-readable instructions 214 to obtain data collected by action module 206. Upon obtaining the data collected the by action module 206, processor 202 may provide the data, via interface 210 and/or via interface 206, to communication module 102 to cause communication module 202 to transmit the data over communication network 108. Additionally or alternatively, processor 202 may store the data collected the by action module 206 in a local memory, such as memory 204 or another memory included in or coupled to secure element device 200. In an embodiment, prior to providing the data to communication module 102, and/or storing the data in the local memory, processor 202 may encrypt the data such that the data is transmitted and/or stored in an encrypted form. The encrypted data is transmitted to communication module 102 via first interface 206 by utilization of, for example, the SIM Tool Kit (STK). In another embodiment, the encrypted data is transmitted to communication module 102 via third interface 210. Further, in an embodiment, memory 204 may store the first set of computer-readable instructions 212 and/or the second set of computer-readable instructions 214 in an encrypted form, and processor 202 may be configured to decrypt the instructions prior to executing the instructions.

The first set of instructions and the second set of instructions may collectively define a sequence of operations that includes both authentication operations for authenticating connected device 100 on communication network 108 and control operations for operating of action module 106. An example sequence of operations defined by the first set of instructions 212 and the second set of instructions 214 may include operations of: (a) waking up secure element device 200 and connected device 100, (b) checking a state of connected device 100, (c) retrieving data from action module 106 of connection device 100, (d) formatting the data retrieved from action module 106, (e) encrypting the data and storing the data in a memory (e.g., memory 204 or another suitable memory included in secure element device 200), (0 establishing a network connection on communication network 108, (g) authenticating with communication network 108, (h) opening a session with another communication device (e.g., "a host device") operating on communication network 108, (i) authenticating with the host device, (j) retrieving the encrypted data from the memory, (k) transmitting the encrypted data for the host device, (l) waiting for, and receiving, an acknowledgement from the host device, (m) receiving one or more instructions from the host device, the one or more instructions for controlling operation of action module 106, (n) decrypting the one or more instructions, (o) storing the decrypted one or more instructions in the memory, (p) transmitting one or more acknowledgements to acknowledge successful receipt of the one or more instructions, (q) terminating the connection with the host device, (r) terminating the communication network session, (s) transitioning secure element device 200 and connected device 100 into a sleep state. In an embodiment, the operations (a)-(s) may be performed by secure element device 200, with the order of operations being the same as the order of operations (a)-(s), listed above, or different from the order of operations (a)-(s), listed above.

Further, in an embodiment, the actual operations performed serially by secure element device 200 may omit or combine one or more operations (a)-(s), listed above, and/or may include one or more additional operations not included in the operations (a)-(s) listed above. It is noted that while the operations (a)-(s) are described above as being defined by one or more scripts stored in memory 204 and executed by processor 202, at least some of the operations (a)-(s) may instead be defined or programmed in another component of the secure element device 200, such as in an application specific integrated circuit (ASIC) (not shown) included in secure element device 200, in a field programmable gate array (FPGA) included in secure element device 200, in some embodiments.

In an embodiment, secure element device 200 includes an operating system 218 configured to manage various aspects of operation of the secure element device 200. For example, operating system 218 may manage the various interfaces 206-210 of secure element device 200, manage execution of applications stored in memory 204 of secure element device 200, etc. Operating system 218 may be a secure operating system, such as a certified operating system for secure applications. Operating system 218 may be stored in the memory 204 as shown, or may be stored in another suitable memory in secure element device 200. In an embodiment, operating system 218 may also support secure upgrades of network authentication application 212 and/or main function application 214. In some embodiments, operating system 218, itself, may be upgradable.

In an embodiment, operating system 218 of the secure element device 200 may support a scripting language, such as JavaScript or MicroPython, for example. The scripting language may allow an original equipment manufacturer (OEM) or an operator of the connected device 100 to develop custom scripts for defining operation sequences that may be then stored in memory 204, such as custom main application sets of instructions 214. In an exemplary embodiment, processor 202 may be configured to execute the custom sets of instructions 214 to operate action module 106.

Operating system 218 may be responsible for resetting various interfaces of the various interfaces 206-210 of secure element device 200 in response to receiving reset signals by secure element device 202 via the communication interfaces 206-210. In an embodiment, operating system 218 operates to reset the various interfaces 206-210, and operations associated with the various interfaces 206-210 independently, without resetting other ones of the interfaces 206-210 and operations associated with the other ones of the interfaces 206-210. For example, when secure element device 200 receives a reset signal from communication module 102 via first interface 206, secure element device 200 may reset first interface 206, and operations associated with first interface 206, in accordance with the ISO standard, for example, without resetting (i) second interface 208 and operations associated with second interface 208 and (ii) third interface 210 and operations associated with second interface 208, allowing secure element 200 to continue control and normal operation of action module 106.

Figure 2B:
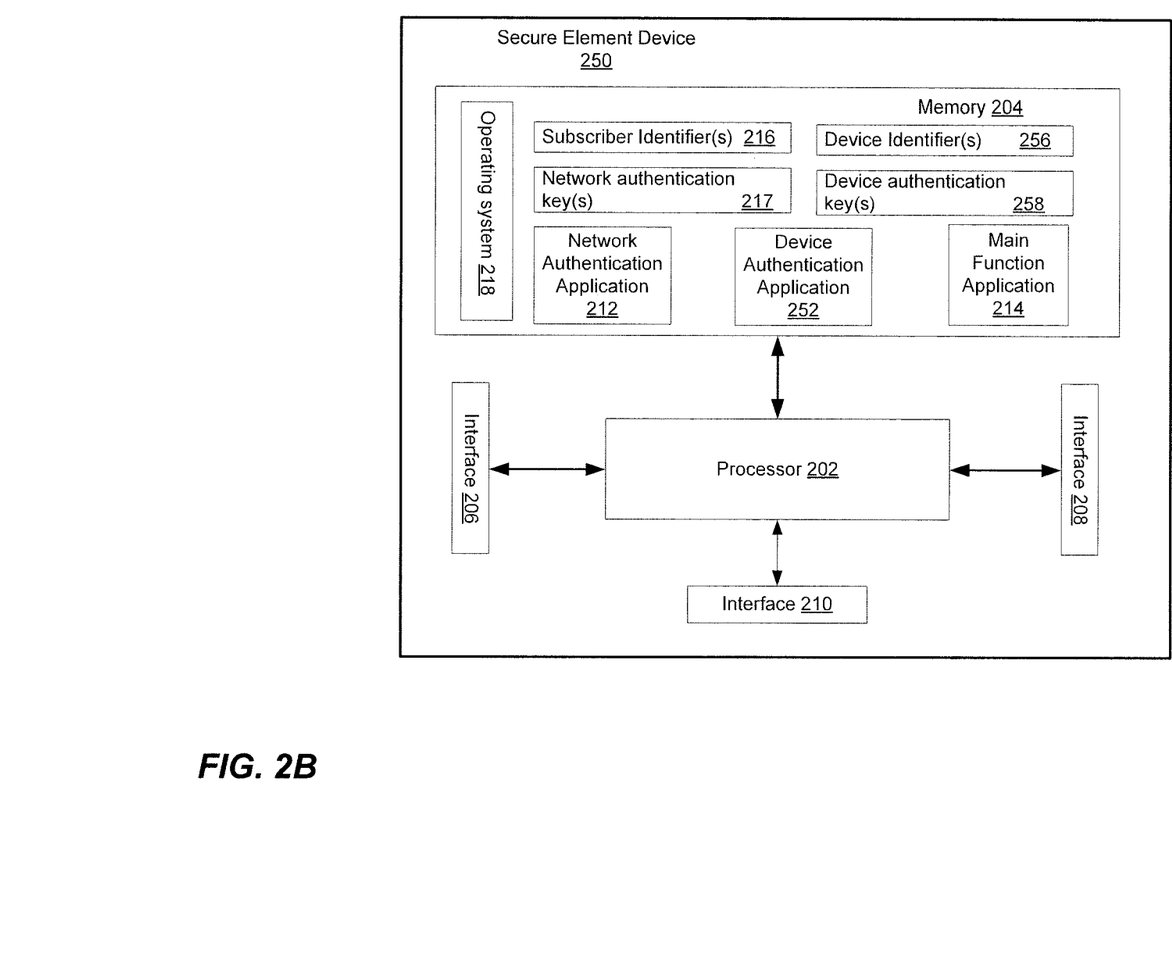
FIG. 2B is a block diagram illustrating another example secure element device of the connected device of FIG. 1, according to one or more embodiments described herein.

FIG. 2B is a block diagram illustrating a secure element device 250. In an embodiment, secure element device 250 corresponds to secure element device 104 of connected device 100 of FIG. 1. In another embodiment, secure element device 250 is used with a suitable device different from connected device 100 of FIG. 1. Similarly, in some embodiments, secure element device 104 of connected device 100 of FIG. 1 is different from the secure element device 250. For ease of explanation, secure element 250 is described with reference to connected device 100 of FIG. 1.

Secure element device 250 is similar to secure element device 200 of FIG. 2A, and includes many of the same-numbered elements with the secure element device 200. Secure element device 250 includes a device authentication application 252, which may be stored in memory 204 in addition to network authentication application 212 and main function application 214. Device authentication application 252 may comprise a third set of computer-readable instructions (sometimes referred herein as "computer-readable instructions 252") for product identification and device management, for example. Processor 202 may execute the third set of computer-readable instructions 252 to enable identification and management of connected device 100 using device identity and management information, such as device identifier(s) 256 and/or device authentication key(s) 258 stored in memory 204. Device identifier(s) 256 and/or device authentication key(s) 258 may be provided to secure element device 250 (e.g., loaded into memory 204 of secure element device 250) by an OEM of connected device 100, for example. In an embodiment, memory 204 may store the third set of computer-readable instructions 252 in an encrypted form, and processor 202 may be configured to decrypt the instructions prior to executing the instructions.

Device identifier(s) 256 and/or device authentication key(s) 258 may be used to securely identify and securely manage connected device 100, in various embodiments. Device operator or manager may securely access secure element device 250, for example using an access key for accessing secure element 250, to obtain device identifier(s) 256 of connected device 100. In operation, processor 202 may execute the third set of computer-readable instructions 252 to provide access to device identifier(s) 256 based the access key, in an embodiment. In some embodiments, remote secure access to device identifier(s) 256 may be provided for example, via communication module 102, over communication network 108. In such embodiments, connected device 100 may be identified remotely, for example over communication network 108.

Securely managing connected device 100 using device identifier(s) 256 and/or device authentication key(s) 258 may include providing secure updates or upgrades to various components of connected device 100, in various embodiments. For example, device authentication key(s) 258 may be used to enable secure updates or upgrades (e.g., software upgrades, firmware upgrades, etc.) of the main function application 214. Such upgrades may include over-the-air (OTA) upgrades, for example. In operation, processor 202 may execute the third set of computer-readable instructions 252 to ascertain, using device identifiers(s) 256 and/or device authentication key(s) 258, that connected device 100 is authorized for a particular upgrade, such as an upgrade to a particular version of main function application 214, for example. Once processor 202 ascertains that connected device 100 is authorized, processor 202 may allow the particular upgrade to be provided to secure element device 250. In an embodiment in which an upgrade is provided wirelessly (OTA), communication module 102 may receive the upgrade over communication network 108 and may provide the upgrade to secure element device 250 via link 114 and interface 210. In an embodiment, one or more of device authentication key(s) 258 may be modified during employment of connected device 100, for example to enable secure element device 250 and connected device 100 to securely obtain further updates, such as new versions of main function application 214.

In some embodiments, device identifier(s) 256 and/or device authentication key(s) 258 may be used to remotely manage connected device 100. For example, connected device 100 may be managed by a same entity (e.g., server) that manages network authentication and access for connected device 100, or another suitable entity (e.g., another suitable server), for example. For example, the entity may include or be coupled to a database that stores various information associated with connected device 100, such as device identifier(s) 256 of connected device 100, device authentication key(s) 258 of connected device 100, profile(s) associated with connected device 100, credential(s) of connected device 100, etc. The entity may communicate with secure element device 250 of connected device 100 to manage various operations (e.g., upgrades) using device identifier(s) 256, device authentication key(s) 258, profile (s), credential(s), etc., associated with connected device 100.

In some embodiments, device identifier(s) 256 and/or authentication key(s) 258 may be used to authenticate connected device 100 with an entity other than communication network 108. For example, processor 202 may execute device authentication application 252 to authenticate connected device 100 with a router or a non-cellular network based on device identifier(s) 256 and/or authentication key(s) 258 and to enable connected device 100 to communicate with the router and/or the non-cellular network.

Because device identifier(s) 256 and device authentication key(s) 258 are stored locally in secure element device 250, device identification and authentication may be performed using a suitable standard communication protocol for communicating with the secure element, such as a standard SIM or UICC communication protocol, in an embodiment.

Figure 3:
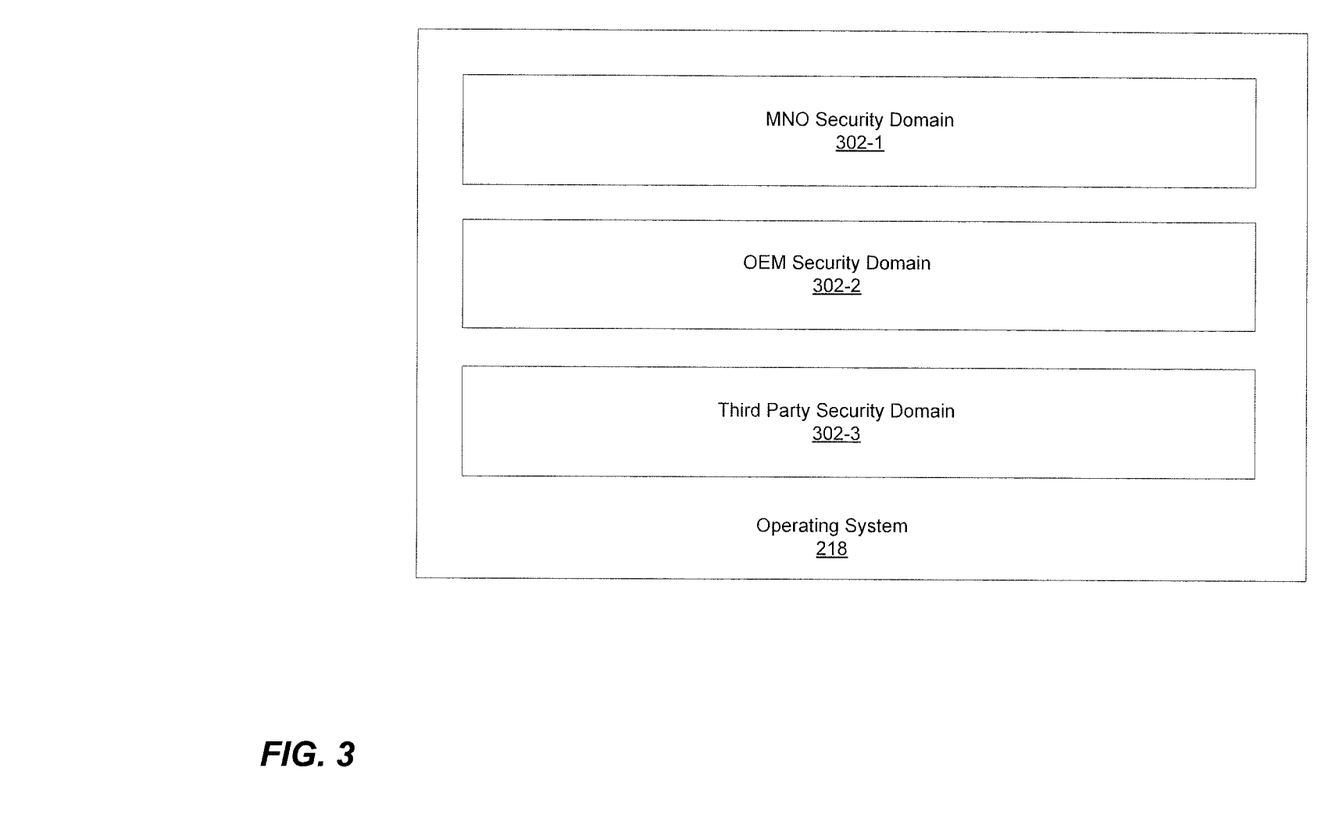
FIG. 3 is a block diagram illustrating example operating system of the secure element device of FIG. 2A and/or FIG. 2B, according to one or more embodiments described herein.

In some embodiments, operating system 218 includes a plurality of separate security domains that may be owned and managed by respective entities that provide services applications, etc. to connected device 100. Referring to FIG. 3, for example, operating system 218 includes a plurality of security domains 302 including an MNO security domain 302-1, an OEM security domain 302-2, and a third party security domain 302-3, in an embodiment. Each security domain 302 may be owned and managed by a corresponding respective entity that provides services, applications, etc. to connected device 100. Thus, for example, MNO security domain 302-1 is owned and managed by a mobile network operator that provides network connection to connected device 100, OEM security domain 302-2 is owned and managed by an original equipment manufacturer of connected device 100, and third party security domain 302-2 is owned and managed by a third party entity, such as a third party that provides third party services, applications, etc., to connected device 100. In some embodiments, security domains 302 of operating system 218 may omit one of more of the security domains 302-1, 302-2, 302-3 illustrated in FIG. 3 and/or may include one or more security domains not illustrated in FIG. 3. For example, although only one third party security domain 302-3 is illustrated in FIG. 4, operating system 218 may include multiple third party security domains 302-3 respectively owned and managed by different third party entities, in some embodiments.

Respective security domains 302 store respective data and applications provided by the respective entities, in an embodiment. For example, MNO security domain 301-1 contains network authentication application 212 of FIGS. 2A-2B, subscriber identifier(s) 216 of FIGS. 2A-2B, network authentication key(s) 217 of FIGS. 2A-2B and/or other applications and data that may be utilized by connected device 100 for performing network operations, such as authenticating on network 108, establishing connections on network 108, etc., in an embodiment. Similarly, OEM security domain 302-2 contains device authentication application 252 of FIG. 2B, device identifier(s) 256 of FIG. 2B, device authentication key(s) 258 of FIG. 2B and/or other applications and data that may be utilized by connected device 100 for managing connected device 100, in an embodiment. In an embodiment in which main function application 214 is provided by the original device manufacturer of connected device 100, OEM security domain 302-2 may also contain main function application 214 an may also contain data associated with main function application 214, such as data obtained from action module 106 when processor 202 executes main function application 214. In another embodiment, a third party entity may provide main function application 214. In this embodiment, third party security domain 302-3 may contain main function application 214 and data associated with main function application 214. In some embodiments, one or more other applications, in addition to or instead of main function application, may be provided by one or more third party entities, and the one or more other applications may be stored in respective one or more third party security domains 302-3.

In an embodiment, each security domain 302 may be protected by a respective access key. Operating system 218 may provide access to a security domain 302 only to an entity that possesses the corresponding access key. For example, operating system 218 provides access to MNO security domain 302-1 to a mobile network operator based on a first access key that is known to the mobile network operator, provides access the OEM security domain 302-2 to the original equipment manufacturer based on a second access key known to the original device manufacturer, and provides access to third party security domain 302-3 to a third party entity based on a third access key known to the third party entity. As a result, operating system 218 ensures that various applications, data, etc., contained in a security domain 302 can be managed only by the entity that owns the corresponding access key. For example, operating system 218 ensures that various applications, data, etc., contained in a security domain 302 can be updated, or in any way manipulated, only by the entity that owns the corresponding access key, in an embodiment.

Operating system 218 may maintain one or more secure repositories that allow processor 202 to securely operate connected device 100 and ensure that only authorized operations are performed by various components of connected device 100. In an embodiment, each of one or more of security domains 302 may include a respective secure repository that may securely store information to be used for managing various applications and services provided by the entity that owns the corresponding security domain 302. For example, each secure repository may store a device identifier of connected device 100, information regarding hardware characteristics of connected device 100 (e.g., information identifying hardware features of connected device 100 that are authorized for use by connected device 100), information identifying versions of software applications that can be used by connected device 100, information identifying versions of firmware that can be used by connected device 100 etc., in various embodiments. Additionally, each security domain 302 may store a respective secure repository application. Processor 202 may be configured to execute each secure repository application to obtain information from corresponding secure repository, and to manage associated applications and services based on the obtained information.

Operating system 218 may allow access to information stored in secure repository of a security domain 302 using the corresponding access key to ensure that only the entity that possess the access key can obtain and manipulate (e.g., update) the information, thereby protecting the information from being manipulated by an unwanted party (e.g., a hacker). Moreover, information in a secure repository of a security domain 302 may be signed by a data authentication key. Information obtained from the secure repository of security domain 302 may be authenticated using the corresponding data authentication key to ensure that the information is authentic and has not been manipulated by an unwanted party, for example. The data authentication key may be provided by the entity that provides the corresponding service, or may be provided by manufacturer of secure element device 200, 250, for example, in various embodiments.

Updating the secure repository may be performed over a secure communication channel between connected device 100 and the entity that is authorized to update the secure repository. Processor 202 may establish the secure communication channel over network 108. In some embodiment, processor 202 may allow the secure repository to be updated only via a specialized secure connection, such as a special secure wireless or wired connection, other than network 108.

Processor 202 may interface with respective security domains 302 using a standard secure channel communication protocol, such as a protocol defined by the Global Platform specification, in an embodiment. Processor 202 may obtain information stored in respective secure repositories of security domains 302, and may utilize the information obtained from secure repositories of respective security domains 302 to provide various authorized services to connected device 100, for example, in an embodiment.

In an embodiment, processor 202 may obtain, from a secure repository of a particular security domain 302 (e.g., OEM security domain 302-2), an identifier of connected device 100. The identifier may be provided by owner of the particular security domain 302, and may be signed by a corresponding key, for example. Processor 202 may cause the signed identifier obtained from secure repository to be transmitted over network 108, for example to provide identity of connected device 100 to an entity (e.g., a server) being used to manage and/or operate connected device 101. As another example, processor 202 may obtain, from a secure repository of a particular security domain 302 (e.g., third party security domain 302-3), a certificate that may be used in validating an update, such as a software update or a firmware update, provided to connected device 100. Processor 202 may utilize the certificate to validate an update prior to allowing the update to be loaded to corresponding security domain 302, for example, in an embodiment. In some embodiments, processor 202 may utilize information obtained from a secure repository of security domain 302 to ensure that a third party is allowed access to certain hardware of connected device 100, such as certain hardware features of communication module 102 or action module 106, prior to providing the access. In some embodiments processor 202 may utilize information obtained from secure depository of security domain 302 to perform secure boot and initialization of operating system 218 and/or software running on operating system 218. In an embodiment, operating system 218 is designed such that an update to operating system 218 will not affect (e.g., in any way change or modify) information stored in secure repositories maintained by operating system 218.

In various embodiments, information in a secure repository of security domain 302 may be used by processor 202 to ensure that only authorized applications and services are available for use by connected device 100 and/or that only authorized hardware features included in connected device 100 (e.g., hardware features of communication module 102, hardware features of action module 106, etc.) are available for use by connected device 100. For example, in an embodiment, prior to executing an application stored in a security domain 302, processor 202 may determine, based on information in secure repository of the security domain 302, which version (or which lowest version) of the application is authorized for use by connected device 100, and may execute the application only if version of the application matches the authorized version. As a result, processor 202 may execute the application only if the application has been updated to a latest version, or at least to a lowest required version, thereby ensuring that older versions, which may be less secure for example, will not be executed, in an embodiment. As another example, security domain 302 may store multiple different applications, but connected device 100 may be authorized to utilize some, but not all, of the different applications, in an embodiment. The particular applications authorized for use by connected device 100 are identified by corresponding identifiers stored in secure repository of security domain 302, and processor 202 may utilize the identifiers to ensure that applications that are not authorized for use by connected device 100 will not be executed by processor 202, in an embodiment. Similarly, connected device 100 may include multiple hardware features and capabilities, but connected device 100 may be authorized to utilize some, but not all, of the hardware features and capabilities. The particular hardware features and capabilities authorized for used by connected device 100 are identified by corresponding identifiers stored in secure repository of security domain 302, and processor 202 may utilize the identifiers to ensure that hardware features and capabilities that are not authorized for use by connected device 100 will not be available to applications executed by processor 202, in an embodiment In an embodiment, processor 202 may utilize information in a secure repository of the MNO security domain 302-1 to disable communication module 102 if communication module 102 does not support a new communication standard being utilized by mobile network operator, where the new communication standard is identified in secure repository of the security domain 302-1. Disabling communication module 102 if communication module 102 does not support the new communication standard ensures that communications of connected device 100 will not degrade communications of other devices on network 108 that may be communicating on network 108 using the new communication standard, for example, in an embodiment. As another example, processor 202 may utilize information in the secure repository of MNO security domain 302-1 to deny access to connected device 100 to a router (e.g., a WiFi router) that is operating with an obsolete firmware that may be less secure that a latest firmware version and may be more susceptible to a wireless attack, for example. As yet another example, processor 202 may utilize information in a secure repository of the MNO security domain 302-1 (or a third party security domain 302-3) to authenticate connected device 100, and to establish a connection for connected device 100, using an Extensible Authentication Protocol (EAP) for example as defined by the IEEE 802.1x communication standard. While the above embodiments disclose processor 202 utilizing information in a secure repository of the MNO security domain 302-1 to disable communication module 102, or to authenticate or deny access to connected device 100, it is understood that processor 202 may utilize information in a secure repository of any of the disclosed security domains, such as the OEM Security Domain 302-2 and Third Party Security Domain 302-3.

In some embodiments, a secure repository of a security domain 302 (e.g., a third party security domain 302-3) may store a security policy defining if and how connected device 100 may communicate on network 108. As an example, a secure repository of a security domain 302 may store information that defines which one or more devices (e.g., host devices) on network 108 are authorized to receive data from connected device 100. For example, in an embodiment in which action module 106 comprises a camera, the secure policy may identify one or more device on network 108 that are authorized to receive data obtained from the camera. Processor 202 may utilize the security policy to ensure that data obtained from action module 106 will be transmitted to a device via network 108 only if the device is authorized to receive the data from connected device 100, in an embodiment.

Figure 4:
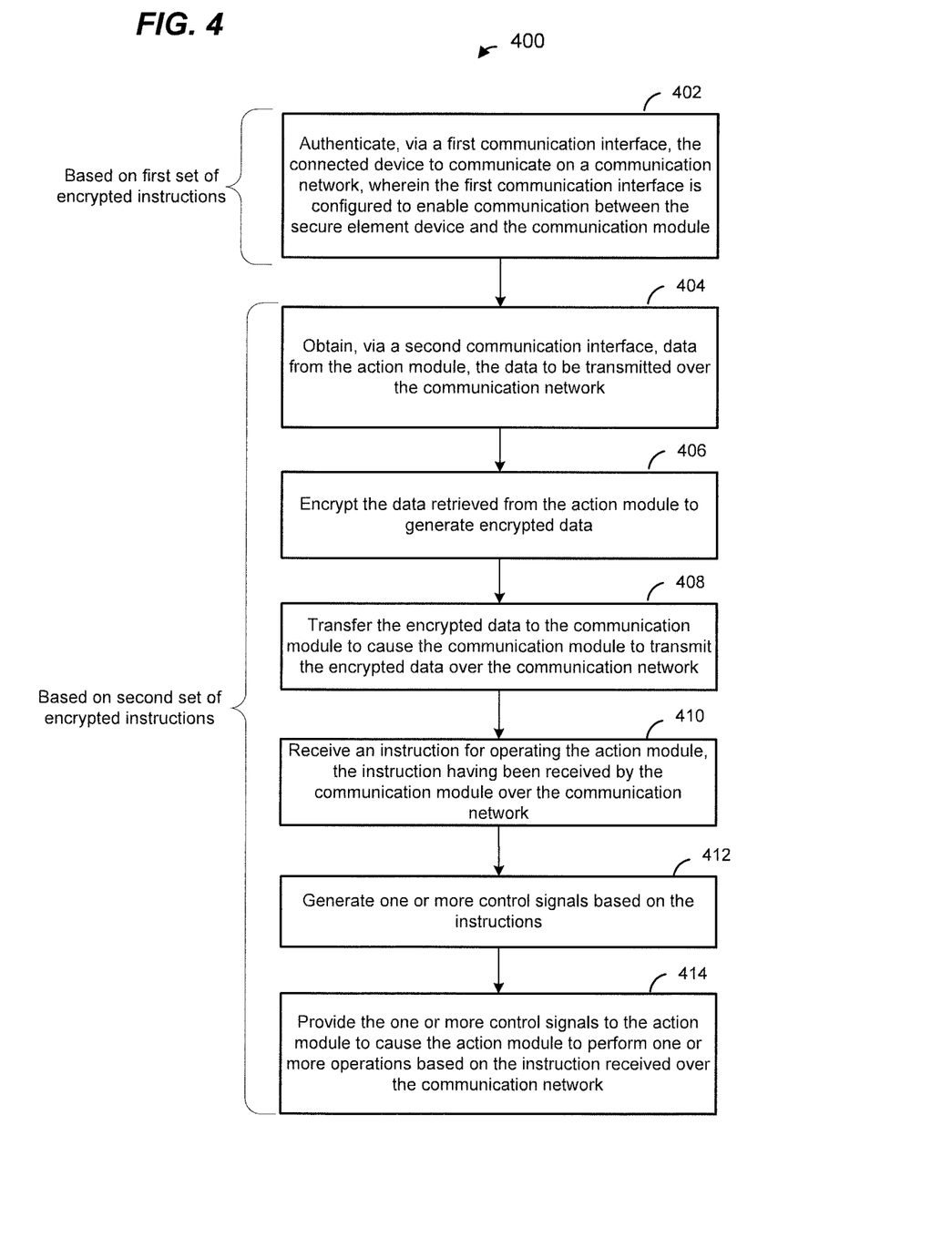
FIG. 4 is a flow chart of an example method for operating a connected device using a secure element device, according to one or more embodiments described herein.

FIG. 4 is a flowchart of a method 400 implemented by a secure element device, in an embodiment. In an embodiment, method 400 is implemented by processor 120 of the secure element device 104 of FIG. 1. In another embodiment, the method 400 is implemented by processor 202 of secure element device 200, 250 of FIGS. 2A, 2B. In other embodiments, method 400 is implemented by a processor of a suitable secure element device different from secure element device 104 of FIG. 1 or secure element device 200, 250 of FIGS. 2A, 2B. In some embodiments, at least a portion of method 400 is implemented by an integrated circuit, of a secure element device, other than a processor, such as an ASIC, for example. For ease of explanation, method 400 is described with reference to connected device 100 of FIG. 1 and secure element device 200, 250 of FIGS. 2A, 2B.

At block 402, processor 202 of secure element device 200 authenticates connected device 100 on communication network 108. For example, processor 202 may execute the first set of computer-readable instructions 212 stored in memory 204 to authenticate connected device 100 on communication network 108. In an embodiment, the first set of computer-readable instructions is stored in a memory (e.g., memory 204) in an encrypted form, and processor 202 is configured to decrypt the instructions after retrieving the instructions from the memory and before executing the instructions. In an embodiment, processor 202 authenticates connected device 100 at block 402 via a first communication interface configured to enable communication between secure element 200 and communication module 102. In an embodiment, first communication interface corresponds to first communication interface 206 of FIG. 1. In another embodiment, another suitable communication interface is used for authenticating the connected device at block 402.

At block 404, processor 202 obtains data from action module 106. In an embodiment, processor 202 obtains the data via a second communication interface configured to enable communication between secure element device 200 and action module 106, in an embodiment. In an embodiment, second communication interface corresponds to second communication interface 208. In another embodiment, another suitable communication interface is used for obtaining data from action module 106. In an embodiment, obtaining the data from the action module 106 at block 404 comprises retrieving the data from a memory disposed in or coupled to the action module 106. In another embodiment, processor 202 obtains the data from action module 106 in another suitable manner. For example, processor 202 instructs action module 106 to collect the data and to provide the collected data, via the second communication interface, directly to processor 202, in an embodiment.

At block 406, processor 202 encrypts the data obtained from action module 106. In an embodiment, processor 202 encrypts the data using a suitable encryption algorithm and a suitable encryption key. At block 408, processor 202 transfers the data encrypted at block 406 to communication module 102. In an embodiment, processor 202 transfers the data encrypted at block 406 to communication module 102 via a third communication interface configured to enable communication between secure element device 200 and communication module 102. In an embodiment, the third communication interface used for transferring the encrypted data at block 408 corresponds to third communication interface 210. In another embodiment, another suitable communication interface is used for transferring the encrypted data to communication module 102 at block 408. In an embodiment, the third communication interface used for transferring the encrypted data to communication module 102 at block 408 is different from the first communication interface used for communicating with communication module 102 for authenticating the connected device at block 402.

At block 400, processor 202 receives, from communication module 102, an instruction for operating action module 106, the instruction having been received by communication module 102 over communication network 108. In an embodiment, processor 202 receives the instruction from communication module 102 via the third communication interface. At block 402, processor 202 generates one or more control signals based on the instruction received at block 402. At block 404, processor 202 provides the one or more control signals generated at block 402 to action module 106 to cause action module 106 to perform one or more operations based on the received instruction. In an embodiment, processor 202 provides the one or more control signals generated at block 402 to action module 106 via the second communication interface.

In an embodiment, processor 202 performs various operations at blocks 304-404 based on a second set of computer-readable instructions. For example, processor 202 may execute the second set of computer-readable instructions 214 stored in memory 204 to perform the various operations at blocks 404-404. In an embodiment, the second set of computer-readable instructions is stored in a memory (e.g., memory 204) in an encrypted form, and processor 202 is configured to decrypt the instructions after retrieving the instructions from the memory and before executing the instructions.

In some embodiments, method 400 omits one or more of the blocks 404-400 shown in FIG. 3 and/or may include one or more additional blocks not shown in FIG. 3. For example, method 400 may be implemented in a connected device that is not configured to control an action module to perform operations based on received instructions. In this embodiment, method 400 may omit blocks 400-404. As another example, method 400 may be implemented in a connected device that is not configured to collect data. In this embodiment, method 400 may omit blocks 404-408.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any non-transitory computer-readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts such as those described above.

When implemented in hardware, the hardware may comprise one or more of discrete components, an integrated circuit, an application-specific integrated circuit (ASIC), a programmable logic device (PLD), etc.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the invention will be apparent to those skilled in the art from a consideration of the specification or practice of the invention disclosed herein. It is intended that the specification and the described examples are illustrative with the true scope of the invention being set forth in the following claims.

What is claimed is:

1. A connected device including a secure element device for secure operation of the connected device, the secure element device comprising:
    a first communication interface configured to enable communication with a communication module of the connected device;
    a second communication interface configured to enable communication with an action module of the connected device, the action module comprises one or both of (i) a sensor and (ii) an actuator;
    a third communication interface for communicating with the communication module, wherein the third communication interface is a type of interface that is different from another type of interface that is the first communication interface;
    a memory storing (i) a first set of computer-readable instructions for authenticating the connected device on a communication network and (i) a second set of computer-readable instructions for operating the action module; and at least one processor coupled to the first communication interface, the second communication interface and the memory, the at least one processor configured to:
  execute the first set of computer-readable instructions to authenticate, via the first communication interface, the connected device on the communication network, and
  execute the second set of computer-readable instructions to perform:
  (i) obtaining, via the second communication interface, data from the action module, the data to be transmitted over the communication network and
  (ii) controlling, via the second communication interface, the action module to cause the action module to perform operations based on an instruction received over the communication network, the operations comprising:
    obtaining, via the second communication interface, data from the action module;
    encrypting the data to generate encrypted data, and
    transferring the encrypted data to the communication module via the third communication interface to cause the communication module to transmit the encrypted data over the communication network,
  wherein the secure element device is tamper resistant.

2. The secure element device of claim 1, wherein the at least one processor is configured to execute the second set of computer-readable instructions to perform further operations comprising:
  receiving, via the third communication interface, an instruction from the communication module, the instruction having been received by the communication module over the communication network,
  executing the instruction to generate one or more control signals, and
  providing, via the second communication interface, the one or more control signals to the action module to cause the action module to perform the one or more operations.

3. The secure element device of claim 2, wherein receiving the instruction comprises receiving the instruction in an encrypted form, and wherein the processor is configured to decrypt the instruction prior to executing the instruction.

4. The secure element device of claim 1, wherein a type of interface that is the third communication interface is an AT command interface.

5. The secure element device of claim 1, wherein the another type of interface that is the first communication interface is one of a (i) general purpose input output (GPIO) interface, (ii) serial peripheral interface (SPI), (iii) inter-integrated circuit (I2C) interface, (iv) ISO 7816 interface, and (v) single wire protocol (SWP) interface.

6. The secure element device of claim 1, wherein the memory stores one or both of (i) the first set of computer-readable instructions and (ii) the second set of computer-readable instructions in an encrypted form.

7. A method for operating a connected device that includes a communication module, a secure element device that is tamper resistant and an action module comprising one or both of (i) a sensor and (ii) an actuator, the method comprising:
  authenticating, by the secure element device based on a first set of computer-readable instructions and via a first communication interface, the connected device to communicate on a communication network, wherein the first communication interface is configured to enable communication between the secure element device and the communication module; and
  performing, by the secure element based on a second set of computer-readable instructions, (i) obtaining, via a second communication interface, data from the action module, the data to be transmitted over the communication network and (ii) controlling, via the second communication interface, the action module to cause the action module to perform operations based on an instruction received over the communication network, wherein the second communication interface is configured to enable communication between the secure element device and the action module,
  wherein the one or more operations comprises:
    encrypting the data retrieved from the action module to generate encrypted data, and
    transferring the encrypted data via a third communication interface to the communication module to cause the communication module to transmit the encrypted data over the communication network, the third communication interface is configured to enable communication between the secure element device and the communication module,
  wherein the third communication interface is a type of interface that is different than another type of interface that is the first communication interface.

8. The method of claim 7, further comprising:
  receiving, by the secure element device via the third communication interface, an instruction from the communication module, the instruction having been received by the communication module over the communication network,
  generating, by the secure element device based on the instruction, one or more control signals, and
  providing, by the secure element device via the second communication interface, the one or more control signals to cause the action module to perform the one or more operations.

9. The method of claim 7, wherein the another type of interface that is the first communication interface is one of (i) general purpose input output (GPIO) interface, (ii) serial peripheral interface (SPI), (iii) inter-integrated circuit (I2C) interface, (iv) ISO 7816 interface, and (v) single wire protocol (SWP) interface.

10. The connected device of claim 7, wherein the secure element device is one of a subscriber identity module (SIM) and a Universal Integrated Circuit Card (UICC).

11. The method of claim 7, wherein a type of interface that is the third communication interface is an AT command interface.

12. A non-transitory, computer-readable medium or media storing encrypted computer-readable instructions that, when decrypted and executed by at least one processor of a secure element device that is tamper resistant and disposed in a connected device, cause the at least one processor to perform operations comprising:
  authenticating, via a first communication interface, the connected device to communicate on a communication network, wherein the first communication interface is configured to enable communication between the secure element device and a communications module of the connected device; and
  performing:
  (i) obtaining, via a second communication interface, data from an action module disposed in the connected device, the data to be transmitted over the communication network and (ii) controlling, via the second communication interface, the action module to cause the action module to perform operations based on an instruction received over the communication network, wherein the second communication interface is configured to enable communication between the secure element device and the action module, wherein the action module comprises one or both of (i) a sensor and (ii) an actuator, wherein the operations comprises:
encrypting the data retrieved from the action module to generate encrypted data, and
transferring the encrypted data via a third communication interface to the communication module to cause the communication module to transmit the encrypted data over the communication network, the third communication interface is configured to enable communication between the secure element device and the communication module, wherein the third communication interface is a type of interface that is different than another type of interface that is the first communication interface.

13. The non-transitory, computer-readable medium or media of claim 12, further storing encrypted computer-readable instructions that, when decrypted and executed by the at least one processor, cause the at least one processor to perform operations comprising:

receiving, via the third communication interface, an instruction from the communication module, the instruction having been received by the communication module over the communication network, generating, based on the instruction, one or more control signals, and providing, via the second communication interface, the one or more control signals to the action module to cause the action module to perform the one or more operations.

14. The non-transitory, computer-readable medium or media of claim 12, wherein a type of interface that is the third communication interface is an AT command interface.

15. The non-transitory, computer-readable medium or media of claim 12, wherein the another type of interface that is the first communication interface is one of a (i) general purpose input output (GPIO) interface, (ii) serial peripheral interface (SPI), (iii) inter-integrated circuit (I2C) interface, (iv) ISO 7816 interface, and (v) single wire protocol (SWP) interface.

* * * * *